(12) United States Patent
Wentink (10) Patent No.: US 7,623,545 B2
(45) Date of Patent: Nov. 24, 2009

(54) METHOD AND APPARATUS FOR EXTENDED CONTROL OVER A WIRELESS MEDIUM BETWEEN TWO OR MORE DEVICES

(76) Inventor: Menzo Wentink, 3511AB, Utrecht (NL)

( * ) Notice: Subject to any disclaimer, the term of this patent is extended or adjusted under 35 U.S.C. 154(b) by 340 days.

(21) Appl. No.: 11/549,438

(22) Filed: Oct. 13, 2006

(65) Prior Publication Data

US 2007/0086346 A1    Apr. 19, 2007

Related U.S. Application Data

(60) Provisional application No. 60/735,023, filed on Nov. 8, 2005, provisional application No. 60/727,120, filed on Oct. 14, 2005.

(51) Int. Cl.
*H04J 3/02* (2006.01)
*H04B 7/12* (2006.01)
*H04L 12/413* (2006.01)
*H04L 12/43* (2006.01)

(52) U.S. Cl. ............ 370/462; 370/443; 370/445; 370/458

(58) Field of Classification Search ............ 370/336, 370/348, 322, 443, 459, 460, 461, 462
See application file for complete search history.

(56) References Cited

U.S. PATENT DOCUMENTS

| 5,231,634 | A * | 7/1993 | Giles et al. ............ 370/348 |
| 6,192,230 | B1 * | 2/2001 | van Bokhorst et al. ... 455/343.3 |
| 2005/0063408 | A1 * | 3/2005 | Famolari ............ 370/431 |
| 2005/0068924 | A1 * | 3/2005 | Lindskog et al. ............ 370/338 |
| 2005/0135302 | A1 * | 6/2005 | Wang et al. ............ 370/329 |

* cited by examiner

*Primary Examiner*—Nick Corsaro
*Assistant Examiner*—Larry Sternbane
(74) *Attorney, Agent, or Firm*—McDonnell Boehnen Hulbert & Berghoff LLP (57) ABSTRACT

Included are embodiments for protecting a Media Access Control (MAC) layer. At least one embodiment of a method includes receiving first data from a communications device, the first data being received via a wireless transmission, the first data including a first duration and associating a second duration with response data, the response data being configured to acknowledge receipt of the first data.

23 Claims, 8 Drawing Sheets

METHOD AND APPARATUS FOR EXTENDED CONTROL OVER A WIRELESS MEDIUM BETWEEN TWO OR MORE DEVICES

CROSS REFERENCE

This application claims the benefit of U.S. Provisional Application No. 60/735,023, filed Oct. 14, 2005, which is hereby incorporated by reference in its entirety. This application also claims the benefit of U.S. Provisional Application No. 60/727,120, filed Oct. 14, 2005, which is also incorporated by reference in its entirety.

BACKGROUND

With the emergence of wireless communications, a plurality of wireless mediums such as Wireless Fidelity (WIFI), Session Initiation Protocol (SIP), Worldwide Interoperability for Microwave Access (WiMAX), etc. have emerged. Utilization of one or more of the wireless medium has provided users with the ability to communicate with other users, computers, etc. without the constraints of a wired connection. To further facilitate mobility, many communications devices also utilize wireless power sources, such as batteries. As many of these wireless communications device utilizes battery power, conserving power to extend battery life has emerged as a priority.

As such, many communications devices are configured to enter a "dozing" state, during which time the communications device may shut down one or more components, thereby conserving power. While utilization of this dozing state may provide power conservation, problems may arise in determining a when the communication device should awake from a dozing state and/or when the communication device should enter a dozing state.

Similarly, transmit beamforming (and/or other protocols) may be configured to send data from an Access Point directly to a communications device. As such, communications devices that utilize transmit beamforming may not provide other communications devices any indication regarding utilization of the communications medium. As such, interference due to over-utilization of a communications medium may arise.

Thus, a heretofore unaddressed need exists in the industry to address the aforementioned deficiencies and inadequacies.

SUMMARY

Included are embodiments for protecting a Media Access Control (MAC) layer. At least one embodiment of a method includes receiving first data from a communications device, the first data being received via a wireless transmission, the first data containing a first duration and associating a second duration with response data, the response data being configured to acknowledge receipt of the first data.

Also included are embodiments of a system for protecting a Media Access Control (MAC) layer. At least one embodiment includes a receiving component configured to receive first data from a device, the first data being received via a wireless transmission, the first data including a first duration and a first associating component configured to associate a second duration with first response data, the first response data being configured to acknowledge receipt of the first data, wherein the second duration exceeds the first duration.

Other systems, methods, features, and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

This disclosure describes embodiments for providing Media Access Control (MAC) protection for a downlink transmission, for instance, in an Unscheduled Asynchronous Power Save Delivery (U-APSD) exchange. Among other implementations, this may be utilized when an Access Point uses transmit beamforming (TxBF) on the downlink transmission. U-APSD is a power save mechanism that may be utilized in a Voice over IP (VoIP) environment or other type of network configurations.

Transmit beamforming is a physical layer that may be configured to send energy in the direction of a receiver communications device, with the purpose of improving reception at the receiver communications device. While transmit beamforming may improve the reception at the receiver communications device, many times, utilization of transmit beamforming may create hidden nodes as a side effect. Embodiments of this disclosure discuss utilization of a Network Allocation Vector (NAV) to alleviate this problem. A similar protection technique can be utilized for a PS-Polling mechanism.

More specifically, in at least one embodiment, an uplink frame from the communications device (which may include voice and/or other types of data and may be sent via a frame, packet, etc.) sets a NAV for pending response data (e.g., an acknowledgement), as may be utilized in IEEE 802.11 procedure. The acknowledgement may be configured to carry a duration equal to 0, for a non-fragmented voice frame. In at least one embodiment, an Access Point associated with the client communications device may be configured to utilize the acknowledgement to set a NAV for the turnaround time and the downlink transmission plus another acknowledgement. The Access Point turnaround time may include the time utilized in fetching and preparing a downlink frame. A Point Coordination Function Interframe Space (PCF Interface Space or PIFS) time is added for the Access Point to determine whether the medium is idle, because the medium may be occupied if the communications device performs a Short Interframe Space (SIFS) continuation after an acknowledgement.

Utilization of an acknowledgement NAV may provide that no additional protection frame needs to be transmitted. Additionally, the Access Point may be configured to ensure that no other node can attempt to utilize the medium during the uplink and downlink transmissions (or between the two). This may be advantageous to the communications device, because the communications device can return to a dozing state within shortest amount of time, thus saving power. Another advantage is that return traffic can be transmitted by the Access Point using only a short backoff, and without a risk for collisions with or interspersion from transmissions from other devices.

A similar frame exchange can be applied for a power save exchange based on a PS-Polling mechanism. In this nonlimiting example, the communications device may continue SIFS after the acknowledgement of the voice frame with another uplink frame (voice or data). This may not lead to collisions with the Access Point because the Access Point may be configured to wait for at least a PIFS interval before accessing the medium. When another uplink frame follows, the next acknowledgement may carry a similar duration, which covers for the Access Point's turnaround time and the downlink data with acknowledgements.

Figure 1:
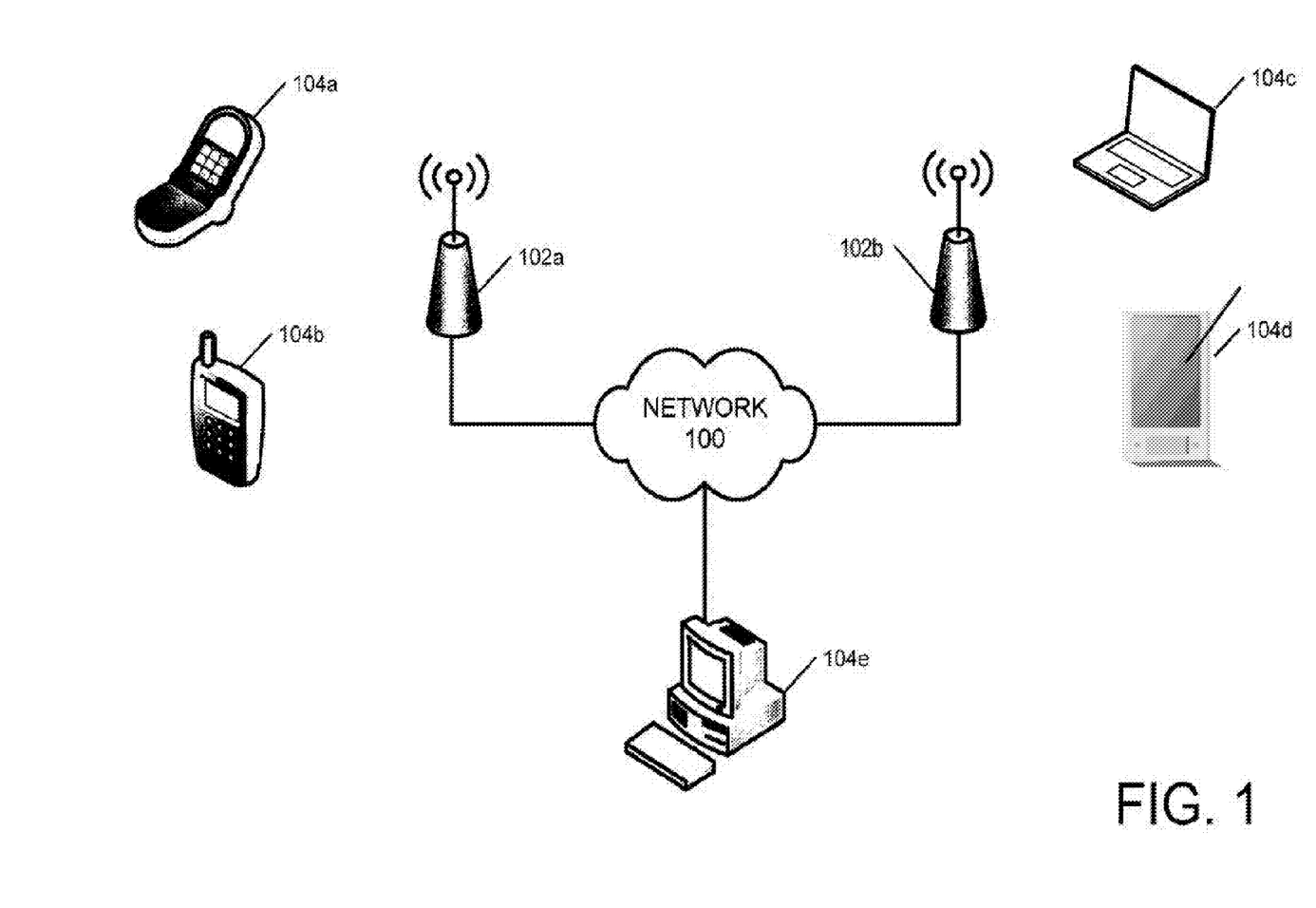
FIG. 1 is an exemplary embodiment of a network configuration for communicating data between communication devices via an Access Point.

Referring now to the drawings, FIG. 1 is an exemplary embodiment of a network configuration for communicating data between communication devices via an Access Point. As illustrated in the nonlimiting example of FIG. 1, network 100 may be coupled to Access Points 102a and 102b. Access Points 102a and 102b can be configured to provide wireless communications to communication devices 104a, 104b, 104c and/or 104d. More specifically, depending on the particular configuration, Access Points 102a and/or 102b may be configured for providing WIFI services, WiMAX services, wireless SIP services and/or other wireless communication services. Additionally, communication device 104b may be coupled to network 100 (via a wired and/or wireless connection) for storing communications between communication device 104e and/or another communication device 104 coupled to network 100.

Network 100 may include a Public Switched Telephone Network (PSTN), a Voice over Internet Protocol (VoIP) network, an Inverted Services Digital Network (ISDN), a cellular network, and/or other mediums for communicating data between communication devices. More specifically, while communications devices 104a and 104b may be configured for WIFI communications, a communications device 104e may be coupled to network 100 and may facilitate communication between users on a communications device 104a and users on a communications device 104e, even though communications device 104e may be configured for PSTN communications, as opposed to VoIP communications.

In operation, user device 104 may be configured to send data to and receive data from Access Point 102. As sending data to and receiving data from Access Point 102 may consume large amounts of power, communications devices 104 may be configured to enter a sleeping or dozing mode to conserve power. However, problems may arise in determining when the communications device should resume normal operation from the dozing mode to send and receive communications data.

Figure 2:
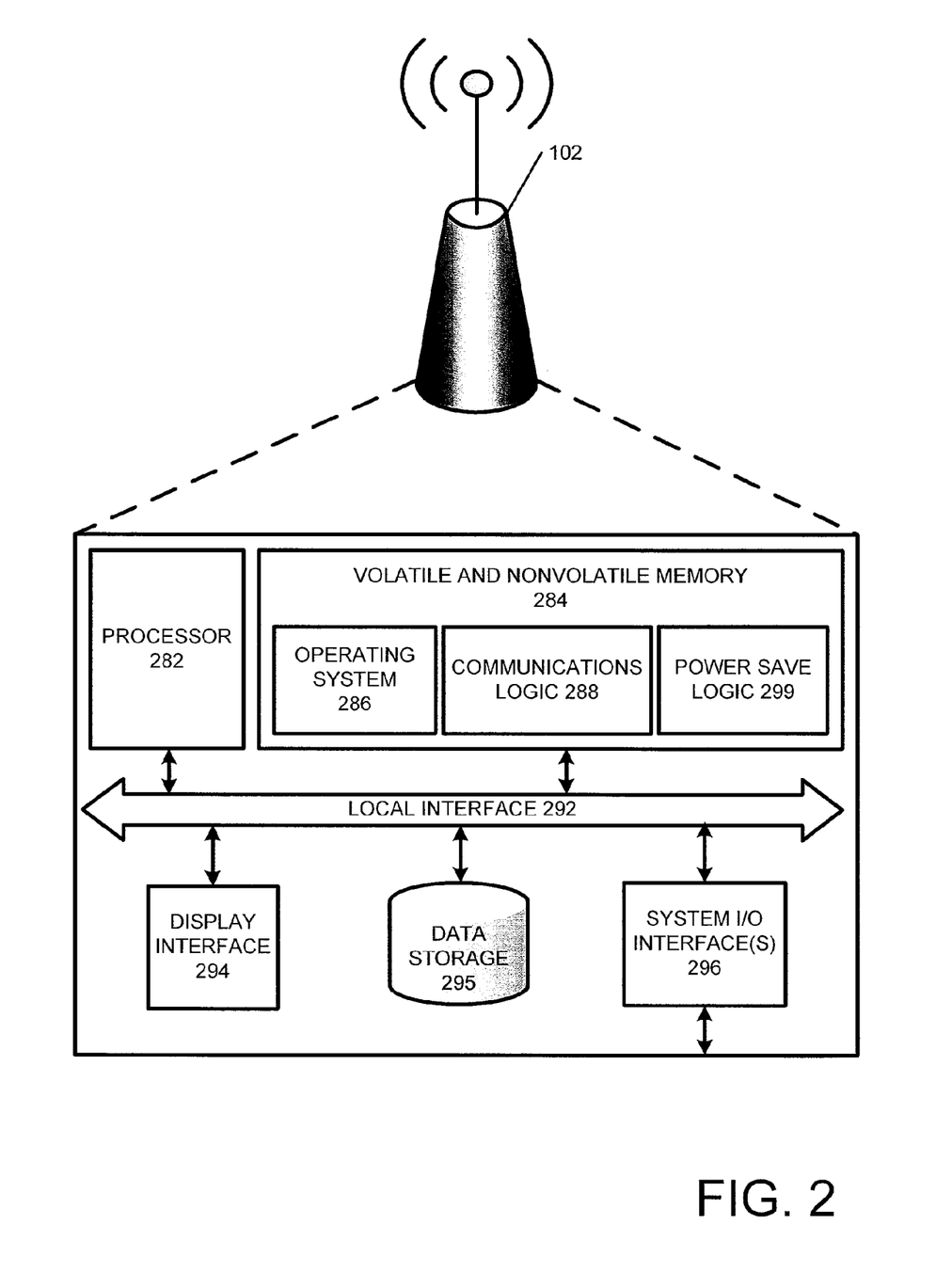
FIG. 2 is a functional block diagram illustrating an Access Point, similar to the Access Point from FIG. 1.

FIG. 2 is a functional block diagram illustrating an Access Point, similar to the analytic component from FIG. 1. Although a wireless device is illustrated, this discussion may be applied to any device configured for receiving and/or sending data. As illustrated in FIG. 2, in terms of hardware architecture, advanced data Access Point 102 may be configured to include a processor 282, volatile and nonvolatile memory 284, a display interface 294, data storage 295, and one or more input and/or output (I/O) device interface(s) 296 that are communicatively coupled via a local interface 292. The local interface 292 can include, for example but not limited to, one or more buses and/or other wired or wireless connections. The local interface 292 may have additional elements, which are omitted for simplicity, such as controllers, buffers (caches), drivers, repeaters, and receivers to enable communications. Further, the local interface may include address, control, and/or data connections to enable appropriate communications among the aforementioned components. The processor 282 may be a hardware device for executing software, particularly software stored in volatile and nonvolatile memory 284.

The processor 282 can be any custom made or commercially available processor, a central processing unit (CPU), an auxiliary processor among several processors associated with the computing device 104, a semiconductor based microprocessor (in the form of a microchip or chip set), a macroprocessor, or generally any device for executing instructions.

The volatile and nonvolatile memory 284 can include any one or combination of volatile memory elements (e.g., random access memory (RAM, such as DRAM, SRAM, SDRAM, VRAM, etc.)) and nonvolatile memory elements (e.g., ROM, hard drive, tape, CD-ROM, etc.). Moreover, the memory 284 may incorporate electronic, magnetic, optical, and/or other types of storage media. Note that the volatile and nonvolatile memory 284 can also have a distributed architecture, where various components are situated remotely from one another, but can be accessed by the processor 282.

The software in volatile and nonvolatile memory 284 may include one or more separate programs, each of which includes an ordered listing of executable instructions for implementing logical functions. In the example of FIG. 2, the software in the volatile and nonvolatile memory 284 may include communications logic 288, power save logic 299, as well as an operating system 286, and a recording cache 297. Additionally, while logic components 286, 288, and 290 are each illustrated in this nonlimiting example as a single piece of logic, as one of ordinary skill in the art will understand, these components can include one or more separate software, hardware, and/or firmware modules. Similarly, one or more of these logical components can be combined to provide the desired functionality. Additionally, the operating system 286 may be configured to control the execution of other computer programs and may be configured to provide scheduling, input-output control, file and data management, memory management, and communication control and related services.

A system component embodied as software may also be construed as a source program, executable program (object code), script, and/or any other entity comprising a set of instructions to be performed. When constructed as a source program, the program is translated via a compiler, assembler, interpreter, or the like, which may or may not be included within the volatile and nonvolatile memory 284, so as to operate properly in connection with the Operating System 286.

The Input/Output devices that may be coupled to system I/O Interface(s) 296 may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem for accessing another device, system, or network), a radio frequency (RF) or other transceiver, a telephonic interface, a bridge, a router, etc. Similarly, network interface 288, which is coupled to local interface 292, can be configured to communication with a communications network, such as the network from FIG. 1. While this communication may be facilitated via an Access Point 102, this is not a requirement.

If the Access Point 102 is a personal computer, workstation, or the like, the software in the volatile and nonvolatile memory 284 may further include a basic input output system (BIOS) (omitted for simplicity). The BIOS is a set of software routines that initialize and test hardware at startup, start the Operating System 286, and support the transfer of data among the hardware devices. The BIOS is stored in ROM so that the BIOS can be executed when an Access Point 102 is activated.

When the computing device 104 is in operation, the processor 282 can be configured to execute software stored within the volatile and nonvolatile memory 284, to communicate data to with the volatile and nonvolatile memory 284, and to generally control operations of the computing device 104 pursuant to the software. Software in memory, in whole or in part, may be read by the processor 282, perhaps buffered within the processor 282, and then executed. Additionally, one should note that while the above description is directed to a computing device 104, other devices (such as application server 110, capture control server 216a, and central recording system 212a) can also include the components described in FIG. 2.

One should note that communications device 104 can be configured with one or more of the components and/or logic described above with respect to Access Point 102. Additionally, Access Point 102, communications device 104, and/or other components of FIG. 1 can include voice recognition logic, voice-to-text logic, text-to-voice logic, etc. (or any permutation thereof), as well as other components and/or logic for facilitating the functionality described herein. Additionally, in some exemplary embodiments, one or more of these components can include the functionality described with respect to Access Point 102.

Figure 3A:
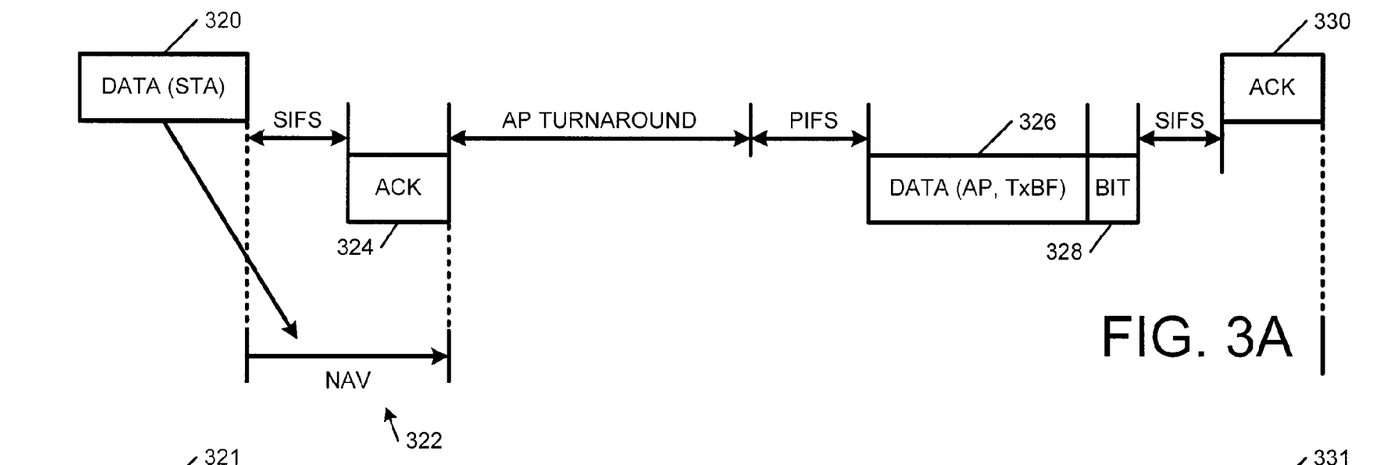
FIG. 3A is an exemplary embodiment of a diagram illustrating utilization of a bit set that is tied to a data frame, such as may be utilized in the network configuration from FIG. 1.

FIG. 3A is an exemplary embodiment of a diagram illustrating utilization of a bit set that is tied to a data frame, such as may be utilized in the network configuration from FIG. 1. As illustrated in the nonlimiting example of FIG. 3A, a communications device 104 may receive data from a user. The data may include voice data and/or other data, depending on the particular embodiment. Upon receiving the data from the user, communications device 104 may convert the data 320 into a desired format, and send the data to an Access Point 102 for transmission to a third party. Additionally included with data 320, communications device 102 may be configured to include, in the header of the transmitted data, a duration of the SIFS and acknowledgement time following the data being sent. The duration may be set by receiving clients in a Network Allocation Vector (NAV) 322, which indicates a virtual carrier sense being active. Additionally, a Short Inter-Frame Space (SIFS) may occur before the Access Point 102 sends acknowledgement 324 back to the communications device 104, indicating that the data 320 is received. Additionally, an Access Point turnaround time and a Point Coordination Function Inter-Frame Space (PCF Inter Frame Space or PIFS) may include the time it takes for Access Point fetch and prepare a down link data frame (e.g., from Access Point 102 to communications device 104), as well as a response time. Additionally, Access Point 102 retrieves buffered data 326 that was received from a third party and associates an End Of Service Period (EOSP) bit set for indicating that there is no further traffic pending at the Access Point 102 and that communications devices 104 can return to sleeping (dozing) mode. The data 326 and bit set 328 can then be sent to the communication device 104. Communications device 104 may send an acknowledgement 330 after a SIFS wait time has occurred and return to dozing mode.

Figure 3B:
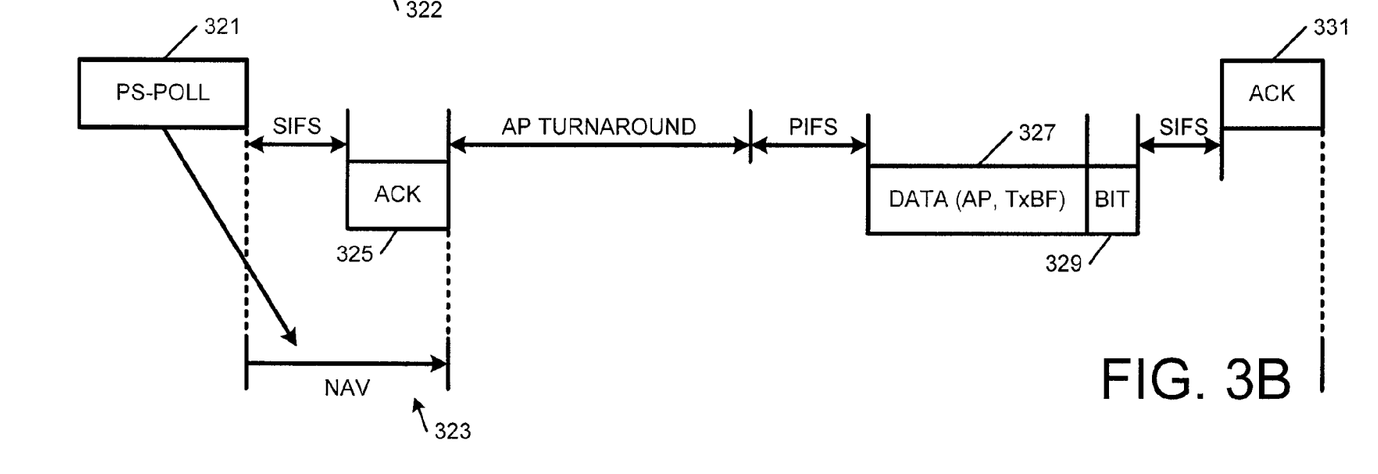
FIG. 3B is an exemplary embodiment of a diagram illustrating utilization of a PS-poll, similar to the diagram of FIG. 3A.

FIG. 3B is an exemplary embodiment of a diagram illustrating utilization of a PS-poll, similar to the diagram of FIG. 3A. As illustrated in nonlimiting example of FIG. 3B, the communications device 104 can send a PS-poll 321 to determine whether there is buffered data associated with Access Point 102. Implicitly included in the PS-poll 321 is a NAV 323, which covers the duration of the acknowledgement response. After a SIFS, Access Point 102 may send an acknowledgement 325, indicating that the Access Point 102 received the PS-poll 321. After an Access Point turnaround and PIFS backoff, Access Point 102 may send data 327 and bit set 329 that may have been received by a third party and buffered. After a SIFS, communication device 104 may send an acknowledgement 331 indicating that the communication device 104 received the transmitted data 327.

Figure 4A:
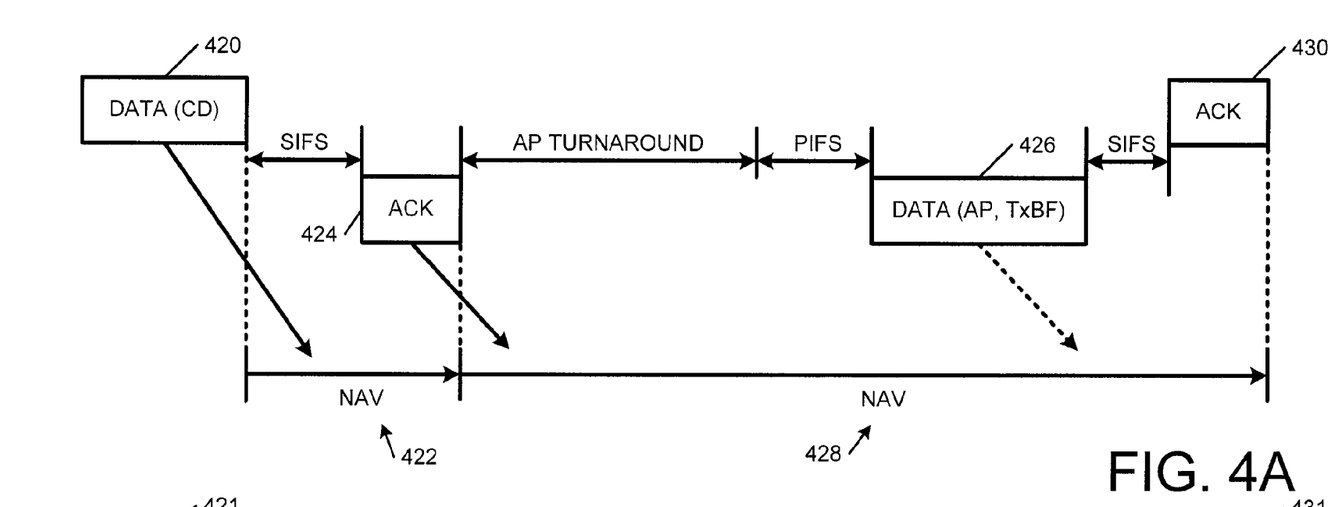
FIG. 4A is an exemplary embodiment of a diagram illustrating utilization of an acknowledgement signal that may be configured for utilization with a MAC, similar to diagrams from FIGS. 3A and 3B.

FIG. 4A is an exemplary embodiment of a diagram illustrating utilization of an acknowledgement signal that may be configured for utilization with a MAC, similar to diagrams from FIGS. 3A and 3B. As illustrated in the nonlimiting example FIG. 4A, communications device 104 may receive data from a user and may convert the received data into a desired format. Communications device 104 may then send the converted data 420 to Access Point 102. Included in the header of the transmitted data 420 may be a duration field (not shown) for setting a NAV 422, indicating a duration of the following SIFS interval and acknowledgement transmission. After a SIFS delay, Access Point 102 may send an acknowledgement 424 to the communication device 104. The acknowledgement 424 may indicate that Access Point 102 has received the transmitted data 420. Additionally, the acknowledgement 424 may include a duration field, which may include a duration for any of a plurality of the events that may commence after transmission of the acknowledgement 424.

More specifically, Access Point 102 may be configured to determine an estimated Access Point turnaround time, a PIFS time, a duration of transmitted data time 426, an SIFS time, and an acknowledgement time 430, and/or other time. Additionally, upon determining one or more of the times described above, the Access Point 102 may set a duration within the acknowledgement 424 such that a NAV 428 may be set for protecting a media access control layer. The estimation of the duration of one or more of the above listed events may protect the MAC layer by indicating to other communication devices 104 associated with Access Point 102 that this communications device 104 is currently receiving data from the Access Point 102.

More specifically, the estimated turnaround time may be zero, so that the time between the end of the acknowledgement and the Access Point 102 continuing is PIFS. As such, utilization of an acknowledgement with a duration field that includes data associated with one or more future events may preclude the necessity of sending separate protection frames to set a NAV for the duration of the response from Access Point 102. More generally, the nonlimiting example of FIG. 4A may be configured to provide less accurate data with regard to utilization of the wireless medium, while utilizing a smaller amount of that medium and resetting a NAV when no longer needed.

Figure 4B:
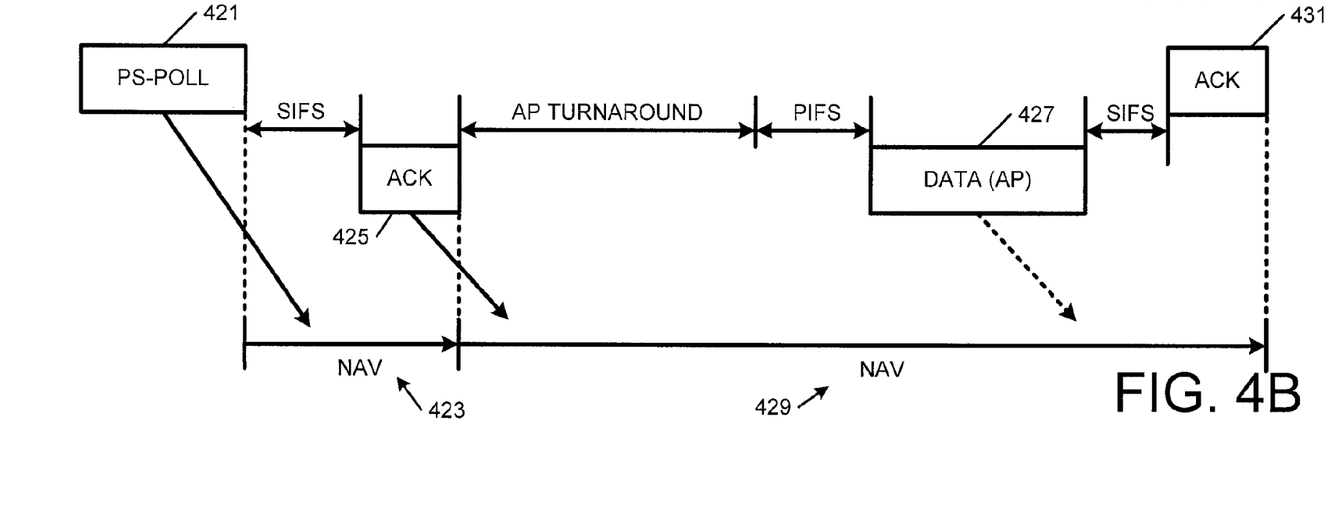
FIG. 4B is an exemplary embodiment of diagram illustrating utilization of an acknowledgement signal for extending a NAV from a PS-Poll similar to diagram from FIG. 4A.

FIG. 4B is an exemplary embodiment of diagram illustrating utilization of an acknowledgement signal for setting a NAV with a PS-Poll similar to diagram from FIG. 4A. As illustrated in nonlimiting example of FIG. 4B, a communications device 104 may currently be set to a dozing or sleeping mode. Periodically, communications device 104 may awake from the dozing mode and send a PS-poll signal 421 to Access Point 102. The PS-poll 421 implicitly sets a NAV 423 indicating a duration of a SIFS and acknowledgement of PS-poll 421. After a SIFS delay, the Access Point may send an acknowledgement 425 indicating that the PS-poll 421 has been received. Additionally, in at least one nonlimiting example, Access Point 102 may be configured to determine an AP turnaround time period, a PIFS time period, a data duration time period, an SIFS time period, and/or an acknowledgement time period by which to include in a duration field associated with the acknowledgement 425. As such, the acknowledgement signal 425 may set NAV 429 of which to protect a media access control layer. More specifically, as discussed above, the acknowledgement can set an estimated duration for future events associated with the communication between Access Point 102 and the communications device 104. As such, other communications devices 104 associated with Access Point 102 may be aware of the medium being utilized in this transmission of data.

Upon sending the acknowledgement 425, Access Point 102 may send communications data 427 received from a third party and buffered for transmission, to communications device 104. After an SIFS delay, the communications device 104 may send an acknowledgement 431 indicating receipt of data 427.

Figure 5:
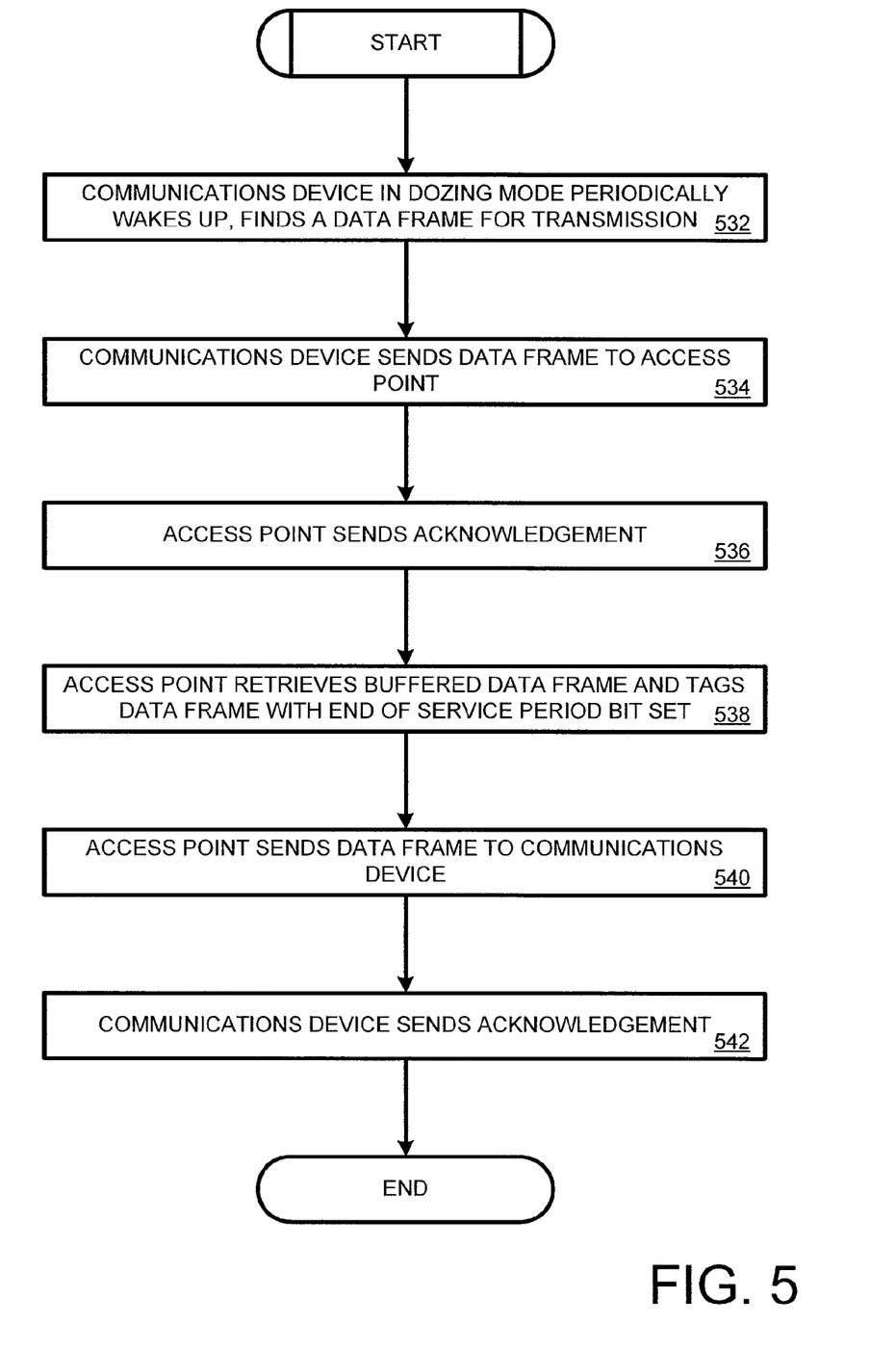
FIG. 5 is a flowchart illustrating an exemplary embodiment of a process for utilizing a data frame with an End Of Service Period (EOSP) bit set, such as may be utilized in the network configuration from FIG. 1.

FIG. 5 is a flowchart illustrating an exemplary embodiment of a process for utilizing a data frame with an End Of Service Period (EOSP) bit set, such as may be utilized in the network configuration from FIG. 1. As illustrated in nonlimiting example FIG. 5, communications device 104 may currently be associated with a dozing mode. The communications device 104 in a dozing mode may periodically resume normal operation from the dozing mode and find a data frame for transmission (block 532). The data frame may be associated with a voice transmission received from a user of a communications device 104 and/or other data to be transmitted to an Access Point 102. Upon determining the presence of a data frame, communications device 104 may send the data frame to Access Point 102 (block 534). Access Point 102 may send an acknowledgement associated with receiving the data from the communications device 104 (block 536). Access Point 102 may then retrieve a buffered data frame and tag the buffered data frame with an end of service period bit set (block 538). Access Point 102 may send the data frame with an attached bit set to communications device 104 (block 540). Communications device 104 may then send an acknowledgement indicating receipt of the data from Access Point 102 (block 542) and return to dozing state.

Figure 6:
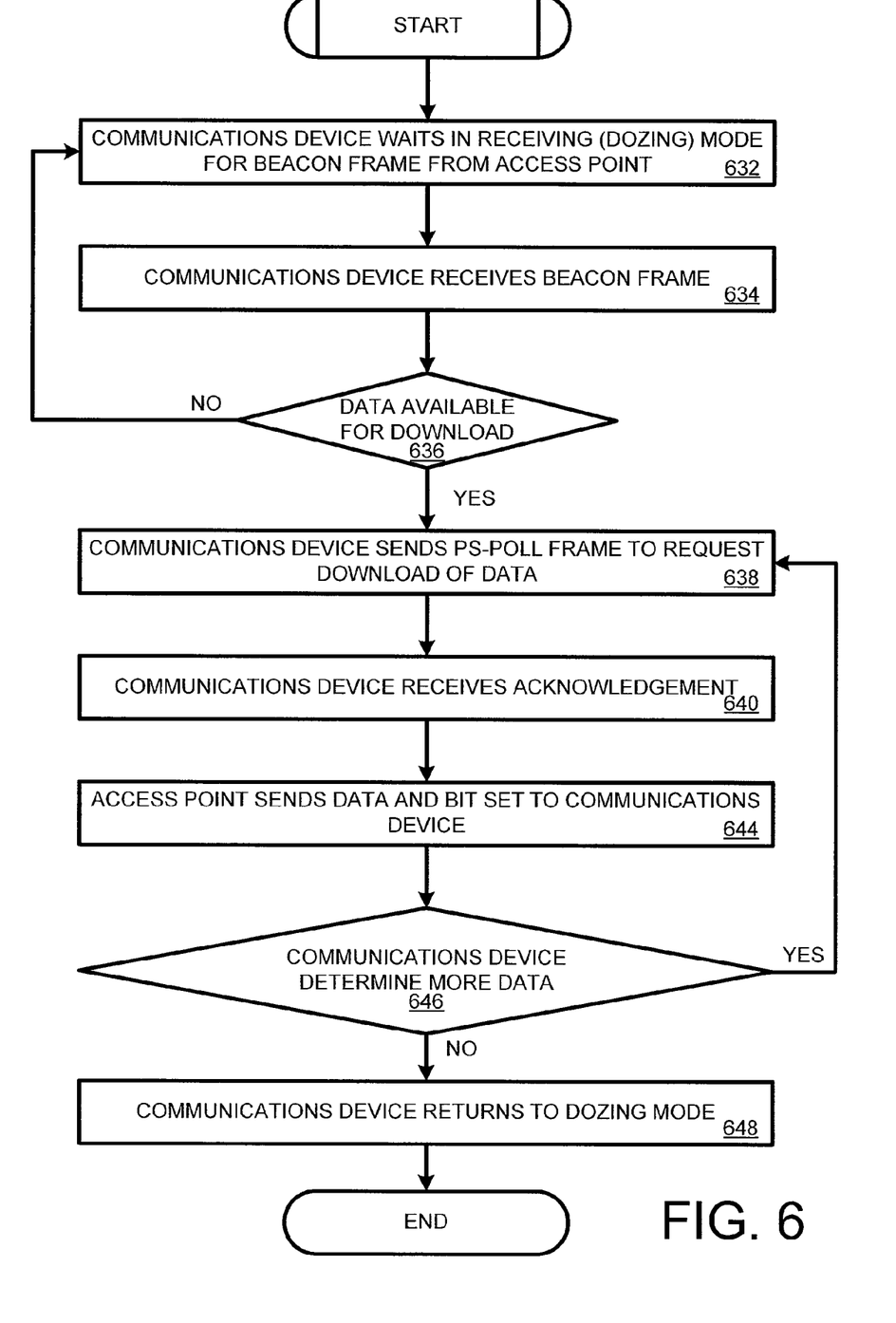
FIG. 6 is a flowchart illustrating an exemplary embodiment of a process that may be utilized with a PS-poll, similar to the flowchart from FIG. 5.

FIG. 6 is a flowchart illustrating an exemplary embodiment of a process that may be utilized with a PS-poll, similar to the flowchart from FIG. 5. As illustrated in the nonlimiting example of FIG. 6, communications device 104 which may be currently associated with a receiving (dozing) mode for a medium frame from Access Point 102 (block 632). Communications device 104 may then receive a beacon frame from Access Point 102 (block 634). Communications device 104 may determine whether data is available for the download from the Access Point 102 (block 636). If no data is available for a download at this time, the flowchart from FIG. 6 may return to block 632 and the communications device 104 can wait in dozing mode for a dozing frame from Access Point 102. If, on the other hand, data is available for download, communications device 104 can send a PS-poll frame to request download of data to that communications device 104 (block 638). Communications device 104 may then receive an acknowledgement from Access Point 102, indicating receipt of the PS-poll (block 640). Access Point 102 may then send new data with the More Data bit set to communications device 104 (block 644). Communications device 104 may determine whether a More Data signal is received (block 646). If a More Data signal is received, the flowchart may return to block 638 where communications device 104 sends a PS-poll frame to request downloaded data. If, on the other hand, a More Data signal is not received, communications device 104 may return to dozing mode (block 648).

Figure 7:
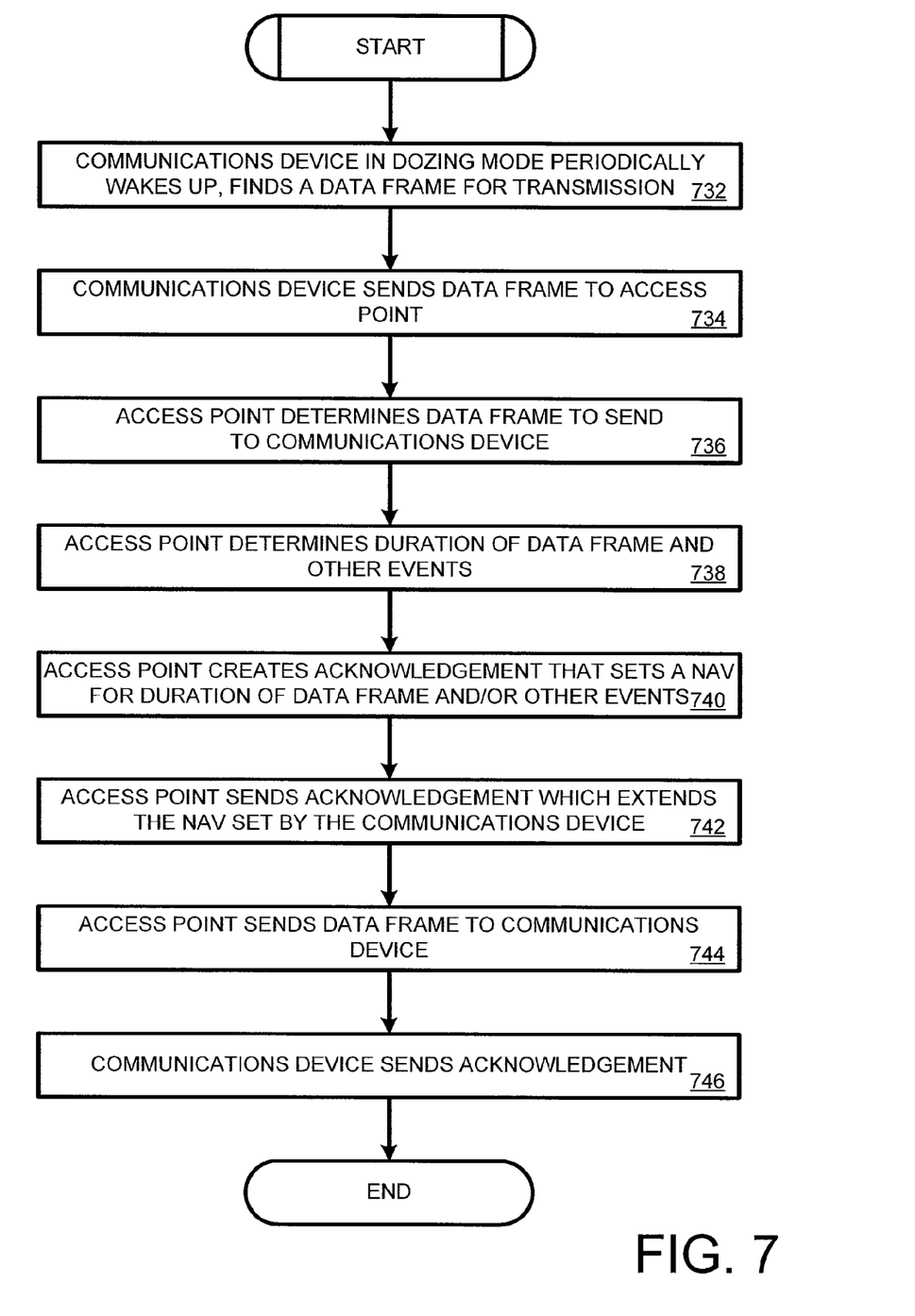
FIG. 7 is a flowchart illustrating an exemplary embodiment of a process that may be utilized for creating an acknowledgement that sets a NAV for the duration of a SIFS interval and acknowledgement frame, similar to flowchart from FIG. 6.

FIG. 7 is a flowchart illustrating an exemplary embodiment of a process that may be utilized for creating an acknowledgement that sets a NAV for the duration of a SIFS interval and acknowledgement frame, similar to flowchart from FIG. 6. As illustrated in nonlimiting example of FIG. 7, communications device 104 may be associated with a dozing mode. Communications device 104 may periodically resume normal operation from the dozing mode and find a data frame for transmission of (block 732). As discussed above, the data frame for transmission may be received from a user and formatted for a transmission via a wireless network. Communications device 104 may send a data frame to Access Point 102 (block 734). Access Point 102 may determine a data frame to send to communications device (block 736). More specifically, in at least one nonlimiting example, Access Point 102 may access a buffer, which may store a data frame from a third party for transmission to the communications device 104. Access Point 102 may then determine a duration of the data frame and other events (block 738). More specifically, depending on the particular configuration, Access Point 102 may determine an Access Point turnaround time, a PIFS time, a duration of the data time, an SIFS time and acknowledgement time, and/or other events that may be utilized when communicating with communications device 104. Access Point 102 may then create an acknowledgement that sets a NAV for duration of the data frame and/or other events determined in block 738 (block 740). Access Point 102 may then send an acknowledgement that may extend the NAV set by the communications device 104 (block 742). Access Point 102 may send the data frame to communications device 104 (block 744). Communications device 104 may send an acknowledgement indicating receipt of the data frame (block 746).

Figure 8:
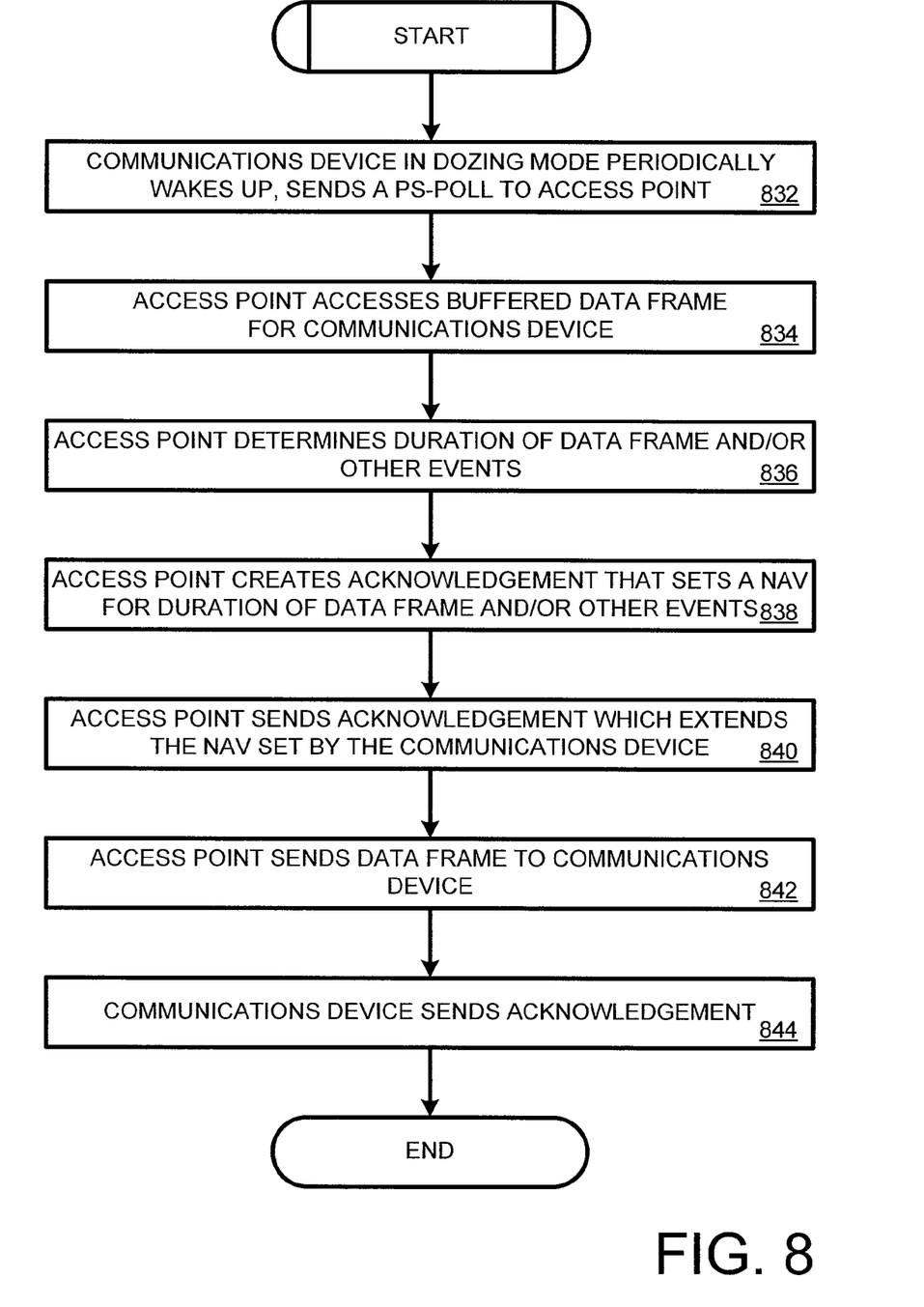
FIG. 8 is a flowchart illustrating the exemplary embodiment of a process that may be utilized for creating an acknowledgement that sets a NAV for the duration of data of a data frame and/or other data with a PS-poll, similar to the flowchart from FIG. 7.

FIG. 8 is a flowchart illustrating the exemplary embodiment of a process that may be utilized for creating an acknowledgement that sets a NAV for the duration of a data frame and/or other events with a PS-poll, similar to the flowchart from FIG. 7. As illustrated in the nonlimiting example of FIG. 8 communications device 104 may currently be associated with a dozing mode. Communications device 104 may periodically resume normal operation from the dozing mode and send a PS-Poll to Access Point 102 (block 832). Access Point 102 may access a buffered data frame for transmission to communications device 104 (block 834). Access Point 102 may then determine a duration of the buffered data frame and/or other data associated with a transmission between Access Point 102 and communications device 104 (block 836). As discussed above, data determined by Access Point 102 may include an Access Point turnaround time, a PIFS time, a SIFS time, an acknowledgement time, and/or other data.

Access Point 102 may then create an acknowledgement that sets a NAV field for duration of the data frame and/or other events described above (block 838). Access Point 102 may then send an acknowledgement that may extend the NAV set by the communications device 104 (block 840). Access Point 102 may send a data frame to communications device 104 (block 842). Communications device 104 may then send an acknowledgement indicating receipt of the data frame (block 844).

The embodiments disclosed herein can be implemented in hardware, software, firmware, or a combination thereof. At least one embodiment disclosed herein may be implemented in software and/or firmware that is stored in a memory and that is executed by a suitable instruction execution system. If implemented in hardware, one or more of the embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software and/or hardware. In this regard, each block can be interpreted to represent a module, component, segment, or portion of code, which may be configured for implementing the specified logical function(s). It should also be noted that in some alternative implementations, the functions noted in the blocks may occur out of the order and/or not at all. As a nonlimiting example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A method for protecting a Media Access Control (MAC) layer, comprising:
receiving a first communications frame from a first device at a second device, the first communication frame including a first reservation duration field indicating an amount of time equal to a first reservation duration that the wireless medium is reserved for communications between the first and second devices;
sending a second communications frame to the first device from the second device within a time period equal to the first reservation duration, the second communications frame including a second reservation duration field indicating an amount of time equal to a second reservation duration that the wireless medium is reserved for communications between the first and second devices, the second reservation duration being greater than the first reservation duration.

2. The method of claim 1, wherein the first communications frame is a data frame or a power-save poll (PS-poll) frame, and the second communications frame is an acknowledgment frame.

3. The method of claim 1, wherein the second communications frame is configured to acknowledge receipt of the first communications frame and to set a Network Allocation Vector that includes the second reservation duration.

4. The method of claim 1, further comprising:
determining that there are one or more additional communications frames that need to be transmitted from the second device to the first device;

in response to determining that there are one or more additional communications frames for transmission to the first device, determining a first estimated duration associated with sending the one or more additional communications frames to the first device; and including the first estimated duration in the second reservation duration, the second communications frame being configured to acknowledge receipt of the first communications frame.

5. The method of claim 4, further comprising sending the one or more additional communication frames to the first device.

6. The method of claim 5, further comprising receiving a third communications frame from the first device at the second device within the time period set by the second reservation duration, the third communications frame being configured to acknowledge receipt of the one or more additional communications frames.

7. The method of claim 6, wherein the first estimated duration includes at least two of the following: an estimated turnaround duration for sending the one or more additional communications frames to the first device, a Point Coordination Function Interframe Space (PIFS) duration, a duration of sending the one or more additional communications frames, a Short Interframe Space duration, and a duration associated with the third communications frame.

8. The method of claim 1, wherein the first device is a wireless terminal and the second device is a wireless access point.

9. The method of claim 4, wherein a last of the one or more additional communications frames includes an end of service period bit setting informing the first device that no additional communications frames are currently queued to be sent to the first device.

10. A system for protecting a Media Access Control (MAC) layer, comprising:
   a first wireless device configured to wirelessly transmit a first communications frame to a second wireless device, the first communications frame including a first reservation duration field indicating an amount of time equal to a first reservation duration that the wireless medium is reserved for communications between the first and second devices;
   a second wireless device configured to wirelessly receive the first communications frame from the first wireless device, and to send a second communications frame to the first wireless device within a time period equal to the first reservation duration, the second communications frame including a second reservation duration field indicating an amount of time equal to a second reservation duration that the wireless medium is reserved for communications between the first and second devices, the second reservation duration being greater than the first reservation duration.

11. The system of claim 10, wherein the first communications frame is a data frame or a power-save poll (PS-poll) frame, and the second communications frame is an acknowledgment frame.

12. The system of claim 10, wherein the second communications frame is configured to acknowledge receipt of the first communications frame and to set a Network Allocation Vector that includes the second reservation duration.

13. The system of claim 10, wherein the second wireless device is configured to determine that there are one or more additional communications frames that need to be transmitted from the second wireless device to the first wireless device, to determine a first estimated duration associated with sending the one or more additional communications frames to the first wireless device, and to include the first estimated duration in the second reservation duration, the second communications frame being configured to acknowledge receipt of the first communications frame.

14. The system of claim 13, wherein the second wireless device is configured to send the one or more additional communications frames to the first wireless device.

15. The system of claim 14, wherein the first wireless device is configured to, upon receipt of the one or more additional communications frames from the second wireless device, send a third communications frame to the second device within the time period set by the second reservation duration, the third communications frame being configured to acknowledge receipt of the one or more additional communications frames.

16. The system of claim 15, wherein the first estimated duration includes at least two of the following: an estimated turnaround duration for sending the one or more additional communications frames to the first device, a Point Coordination Function Interframe Space (PIFS) duration, a duration of sending the one or more additional communications frames, a Short Interframe Space duration, and a duration associated with the third communications frame.

17. The system of claim 10, wherein the first wireless device is a wireless terminal and the second wireless device is a wireless access point.

18. The system of claim 13, wherein a last of the one or more additional communications frames includes an end of service period bit setting informing the first wireless device that no additional communications frames are currently queued to be sent to the first wireless device.

19. A computer program product, comprising a computer usable medium having a computer readable program code embodied therein, said computer readable program code adapted to be executed to implement a method for protecting a Media Access Control (MAC) layer, comprising:
   receiving a first communications frame from a first device at a second device, the first communication frame including a first reservation duration field indicating an amount of time equal to a first reservation duration that the wireless medium is reserved for communications between the first and second devices;
   sending a second communications frame to the first device from the second device within a time period equal to the first reservation duration, the second communications frame including a second reservation duration field indicating an amount of time equal to a second reservation duration that the wireless medium is reserved for communications between the first and second devices, the second reservation duration being greater than the first reservation duration.

20. The computer program product of claim 19, wherein said computer readable program code is further adapted to:
   determine that there are one or more additional communications frames that need to be transmitted from the second device to the first device;
   in response to determining that there are one or more additional communications frames for transmission to the first device, determine a first estimated duration associated with sending the one or more additional communications frames to the first device;
   include the first estimated duration in the second reservation duration, the second communications frame being configured to acknowledge receipt of the first communications frame; and send the one or more additional communication frames to the first device.

21. The computer program product of claim 20, wherein the first estimated duration includes at least two of the following: an estimated turnaround duration for sending the one or more additional communications frames to the first device, a Point Coordination Function Interframe Space (PIFS) duration, a duration of sending the one or more additional communications frames, a Short Interframe Space duration, and a duration associated with the third communications frame.

22. The computer program product of claim 20, wherein the second device is a wireless access point.

23. The computer program product of claim 20, wherein said computer readable program code is further adapted to include in a last of the one or more additional communications frames an end of service period bit setting for informing the first device that no additional communications frames are currently queued to be sent to the first device.

* * * * *

UNITED STATES PATENT AND TRADEMARK OFFICE
CERTIFICATE OF CORRECTION

PATENT NO. : 7,623,545 B2 Page 1 of 1
APPLICATION NO. : 11/549438
DATED : November 24, 2009
INVENTOR(S) : Menzo Wentink It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 382 days.

Signed and Sealed this

Twenty-sixth Day of October, 2010

David J. Kappos
*Director of the United States Patent and Trademark Office*